Feb. 11, 1969     M. T. DERBY     3,426,818
YIELDING NUT RETAINER
Filed May 8, 1967
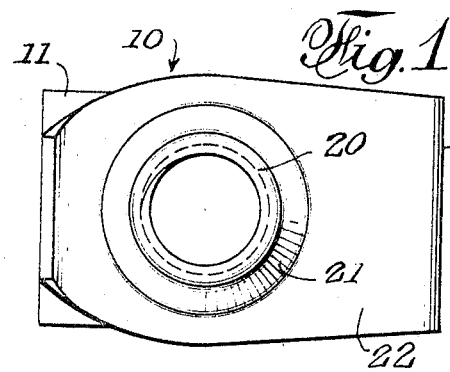
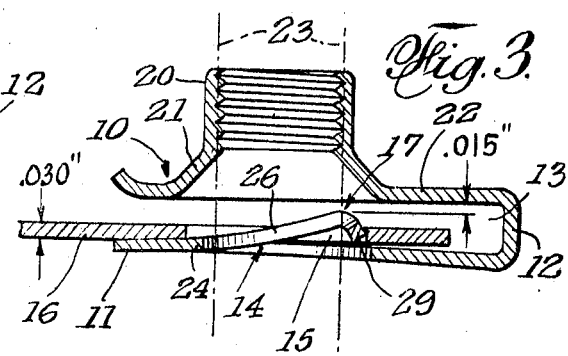
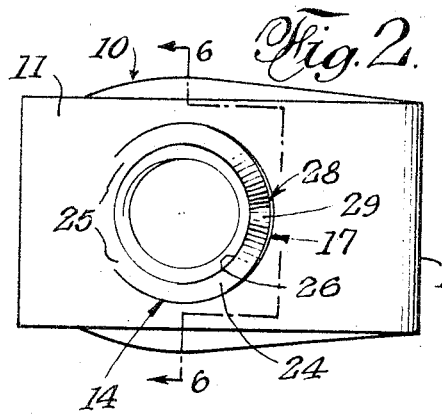
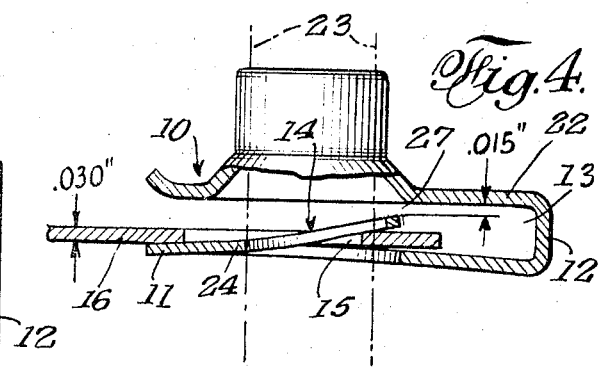
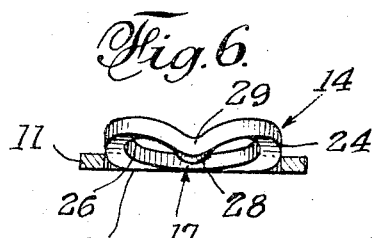
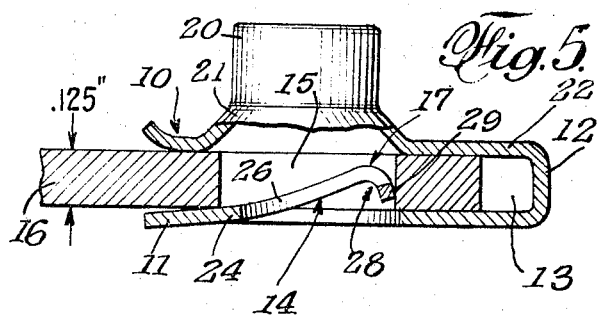
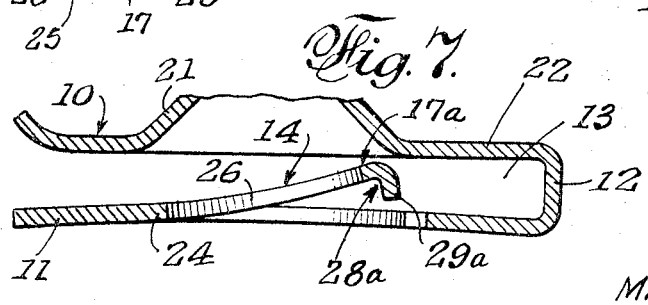
INVENTOR.
MARSHALL T. DERBY
BY C. G. Stratton
ATTORNEY

United States Patent Office 3,426,818
Patented Feb. 11, 1969

3,426,818
YIELDING NUT RETAINER
Marshall T. Derby, Downey, Calif., assignor to California Industrial Products, Inc., Santa Fe Springs, Calif., a corporation of California
Filed May 8, 1967, Ser. No. 636,895
U.S. Cl. 151—41.75  4 Claims
Int. Cl. F16b 39/00

ABSTRACT OF THE DISCLOSURE

A sheet metal nut formed of thin-gauge metal with a resilient retainer for engaging in a hole in any panel of a group having different thicknesses. When so engaged, the screw that is applied to the nut for securing the panel in place is in proper register with said panel hole, so it will pass through said hole in either direction without interference. To this end, the retainer is formed to have an effective thickness sufficiently large to obviate misalignment of the nut and panel holes.

BACKGROUND OF THE INVENTION

The field of the invention is best exemplified in the disclosure of applicant's Patent No. 3,229,743, issued Jan. 18, 1966, the present invention constituting an improvement over the nut there disclosed. Because the thickness range of the panels, usable with the nut shown, is relatively small, when the panels are thin, the retainers, also being thin, allow the nuts, after their application to a panel, to become misaligned for fall out of register with the holes with which the retainers are engaged. In some cases, the nut may become dislodged from the panel, especially if the space between the retainer and the top wall of the nut is greater than the panel thickness.

Accordingly, the present invention has for an object to provide a sheet metal nut formed of thin-walled metal and proportioned to accommodate panels in a wide range of thicknesses, as, for instance, panels that are three times as thick as the metal of the nut, as well as panels as thin or even thinner than the nut metal. It follows, then, that a nut that can be properly retained in register with the holes of a wide range of panel sizes can be more economically produced and obviates stocking of nuts of varying size, thereby reducing inventory and insuring against inadvertent use of nuts of the wrong size.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes preferred embodiments of the present invention, which are given by way of illustration or example only.

SUMMARY OF THE INVENTION

The present nut, whether of J or U shape or form, generally conventionally is formed of single-thickness metal having a top portion 10, a bottom portion 11, and a connecting portion 12 that integrally joins the portions 10 and 11 to define a bifurcation space 13. According to the present invention, a resilient retainer 14 for engagement in a hole 15 of a panel 16, is integrally formed on the portion 11 and is provided with an end portion 17 or 17a, as the case may be, that has a thickness substantially larger than that of the thickness of the metal of the nut, thereby reducing the size of the space 13 between the portions 10 and 11.

In the drawing, like reference characters designate similar parts in the several views.

BRIEF DESCRIPTION OF THE DRAWING

FIG. 1 is a top plan view of a sheet metal nut according to the present invention.

FIG. 2 is a bottom plan view thereof showing one embodiment.

FIG. 3 is a longitudinal sectional view of the nut shown in FIG. 2 and shown in installed position on a panel, preparatory to being engaged by a screw or bolt to secure the nut and, therefore, the panel in place.

FIG. 4 is a similar view showing an example of the prior art.

FIG. 5 is a longitudinal sectional view of the nut of FIG. 3 in installed position on a panel substantially thicker than the panel shown in FIG. 3.

FIG. 6 is a cross-sectional view showing details of the present improvements.

FIG. 7 is an enlarged and partly broken longitudinal sectional view showing another embodiment.

FIG. 8 is a fragmentary plan view of a detailed portion of the second embodiment.

DESCRIPTION OF THE PREFERRED EMBODIMENTS

The top portion 10 of the nut conventionally comprises an internally threaded collar 20 that forms an extension of a frusto-conical portion 21 that is drawn from a base plate 22. Said collar is adapted to receive a screw or bolt 23 represented by the dot-dash lines of FIGS. 3 and 4. The bottom portion 11 is shown as generally coextensive with the portion 10 to form a U-nut, but may be shorter to form a J-nut. Said portion 11 is shown as a plate or leg separated from the plate 22, said two plates being formed so their free edges, opposite the bend-connecting portion 12, are closer together than at said latter portion. There is sufficient resilience in said plates so the same may be spread apart to the maximum extent of the space 13.

The retainer 14 is shown as a resilient, approximately semicircular, part-ring portion 24 sheared from the plate 11, said portion extending from hinge points 25 toward the connecting bend portion 12 and angularly inwardly toward the plate 17, a hole 26 being provided in said ring. Ordinarily, the free end 27, as shown in the example of the prior art illustrated in FIG. 4, occupies a portion of the space 13 of a size according to the thickness of the metal of which the nut is formed. When said space 13 is of a size several times greater than said ring end 27, either the space between said ring end and plate 22, or between the ring end and plate 11, or both, are larger than the thickness of thin panels 16. As a consequence, when a nut, as in FIG. 4, is applied to the panel and slipped onto the edge thereof, the ring portion 24 will snap into the hole 15 in the panel. However, if the end 27 of the ring portion is spaced further from the plate 11 than the thickness of the panel, the end 27 may find its way past the edge of the hole, as in FIG. 4, effecting a displacement of the nut and the panel such that a screw or bolt 23, when applied, will be interfered with by the panel due to non-register of the threaded hole in the collar 20 and the hole in the panel. If the end 27 of the ring portion is spaced further from the plate 22 than the thickness of the panel 16, the ring portion end 27 may slip out of engagement with the hole 15 and the nut may become dislodged entirely. It will be realized, therefore, that the nut of the prior art is limited as to the thickness range of panels 16 to which it may be applied, being effectively snap-retained by thicker panels but becoming misaligned or completely dislodged by thinner panels.

The end portions 17, as in FIGS. 2, 3, 5 and 6, and the end portions 17a, as in FIGS. 7 and 8, by being formed to increase the effective size of the ends 28 or 28a, as the case may be, reduce the spaces on either sides of said ends to sizes that insure that the ring ends retain their snap-retention engagement in the holes 15 of panels in the thickness range between about the thickness of the nut metal and the maximum that can be accommodated between the plates 11 and 22.

The ring end 28 achieves its increased size by indenting or offsetting said end, as at 29, to the point where the same may have an effective thickness of two or three times that of the thickness of the nut metal and yet enable the ring portion 24 to retain its initial resilience for desired snap-action flexure. The ring end 28a achieves its increased size by bending a tab 29a, formed on said end when sheared from the plate 11, thus imparting to said end 28a the desired increased size for effective engagement and retention in the hole 15.

As an example of the advantages of the present improvements, a nut made of metal of a .032" thickness and capable of accommodating a panel of a thickness of .125" (FIG. 5) can also effectively engage a panel of .030 thickness, i.e., about the thickness of said metal (FIG. 3), a panel that could not be engaged by a nut of the prior art (FIG. 4). Even, as shown in FIG. 3, a space as great as 0.15" is left between the end portions 17 or 17a and either plate 11 or 22, such an end portion being retained in the hole into which it snaps. In the prior art form, the same condition provided between the ring end 27 and one of the plates 11 or 22 would result in a large enough space between said end 27 and the other of said plates for the mentioned misalignment or dislodgement to occur.

While this disclosure has basis on a sheet metal nut that integrally comprises an internally threaded collar and a resilient retainer, a single thread may be formed in the plate 22 instead of the threaded collar 20, for engagement by the screw or bolt 23. Also, the present improvement may be embodied in a resilient retainer to which a machine nut is affixed instead of being integrally formed thereon. Thus, provided the nut has a J or U form and the present resilient retainer is provided on one leg thereof, the other leg, in typical ways as above, may be provided with a screw-engaging thread. In the following claims, the term "sheet metal nut" is intended to include bifurcated nuts with resilient retainers, whether or not the threaded part is provided integrally or is affixed to the retainer as above indicated.

While the foregoing has illustrated and described what is now contemplated to be the best mode of carrying out the invention, the constructions are, of course, subject to modification without departing from the spirit and scope of the invention.

Having thus described the invention, what is claimed and desired to be secured by Letters Patent is:

1. In a sheet metal nut of uniform thickness of sheet metal and having a bifurcated shape with a plate having a screw thread, a retainer plate having an opening for passage of a screw to engage said thread and connected to and spaced from the first plate, said nut being adapted to be mounted on a panel having a hole therein by being slid over an edge of the panel adjacent said hole with said edge entering the space formed by the bifurcation between the plates, and said retainer plate having a flexible retainer ring partly sheared therefrom and inwardly angularly bent into the space between the plates toward the plate with the screw thread and toward the connection between said plates, and adapted for snap-on retention engagement in said panel hole, the portion on the free end of the retainer ring being offset from the general plane of said ring to provide the same with an effective thickness at least twice that of the thickness of the ring and to reduce the spaces between said thickened ring end and each of the plates to a size smaller than the thickness of the ring when the ring is unflexed, whereby the ring retains its position in the holes of a range of panels of different thicknesses.

2. In a sheet metal nut according to claim 1, the thickness of the metal forming the nut being approximately one-quarter the size of the space between the plates and the thickness of the thickest panel adapted to fit said space, and the thickness of the offset reducing the mentioned space between the ring and one of the plates to a size smaller than the thickness of a panel approximating the thickness of the nut metal.

3. In a sheet metal nut according to claim 2, said offset in the ring being bent from the ring in a direction back toward the plate from which the ring is sheared.

4. In a sheet metal nut according to claim 2, said offset in the ring comprising a tab extending from the ring and bent out of the plane of the ring back toward the plate from which the ring is sheared.

References Cited

UNITED STATES PATENTS

| | | | |
|---|---|---|---|
| 2,255,469 | 9/1941 | Kost | 151—41.75 |
| 2,298,568 | 10/1942 | Kost | 151—41.75 |
| 2,672,905 | 3/1954 | Hartman et al. | 151—41.75 |
| 3,229,743 | 1/1966 | Derby | 151—41.75 |

EDWARD C. ALLEN, *Primary Examiner.*